United States Patent [19]

Kataoka et al.

[11] Patent Number: 5,358,186
[45] Date of Patent: Oct. 25, 1994

[54] METHOD OF PREPARING GRANULES OF DIPEPTIDE

[75] Inventors: Takehiko Kataoka; Tadashi Takemoto; Harutoshi Ohura, all of Kawasaki; Makoto Nishikawa, Yokkaichi, all of Japan

[73] Assignee: Ajinomoto Co., Inc., Tokyo, Japan

[21] Appl. No.: 112,981

[22] Filed: Aug. 30, 1993

[30] Foreign Application Priority Data

Sep. 4, 1992 [JP] Japan .................. 4-236942

[51] Int. Cl.$^5$ .............................. B02C 7/00
[52] U.S. Cl. ............................ 241/24; 241/22
[58] Field of Search .................. 241/22, 24, 27

[56] References Cited

U.S. PATENT DOCUMENTS 5,110,056  5/1992  Blasczyk et al. ............. 241/24 X
5,111,998  5/1992  Kanda et al. ................. 241/24 X

FOREIGN PATENT DOCUMENTS 0120561  3/1984  European Pat. Off. .
2346988  4/1977  France .
10152686 10/1983  Japan .
59-095862  9/1984  Japan .

OTHER PUBLICATIONS

European Search Report, EP 9311 3913, Apr. 29, 1994.

*Primary Examiner*—Timothy V. Eley
*Attorney, Agent, or Firm*—Oblon, Spivak, McClelland, Maier & Neustadt

[57] ABSTRACT

In producing granules of α-L-aspartyl-L-phenylalanine methyl ester having a particle size of falling within a determined particle size range by compaction granulation, formation of fine powdery α-APM is prevented by breaking the compacted α-APM so that the one-pass yield of the granules is elevated and the sieving efficiency is elevated. In a method of preparing granules of α-L-aspartyl-L-phenylalanine methyl ester by compaction granulation of the ester singly or along with a vehicle of not more than the same amount of the ester, after the compaction or after having roughly broken the compacted material, the material is broken down so as to pass through a screen or perforated plate having pores with a diameter falling within the range of from 1 mm to 10 mm and then further broken and classified.

8 Claims, 3 Drawing Sheets

METHOD OF PREPARING GRANULES OF DIPEPTIDE

BACKGROUND OF THE INVENTION

1. Field of the Invention

The present invention relates to a method of preparing granules of a dipeptide. More particularly, the invention relates to a method of preparing granules of a dipeptide sweetener having high bulk density which may be handled with ease.

α-L-aspartyl-L-phenylalanine methyl ester (hereinafter referred to as α-APM) is one preferred component of the sweetener granules prepared by the present invention. α-APM is a low-calorie sweetener having a sweetness about 200 times that of sucrose, and the worldwide demand for this sweetener is anticipated to be over 10,000 tons per year before 1995.

2. Description of the Related Art

Where α-APM is used in powder form, various problems arise due to the intrinsic characteristics of the powder. For example, α-APM powder easily scatters and easily adheres to the walls of vessels, devices, etc. making its handling difficult. In addition, α-APM powder has low dispersibility and low solubility in water, making dissolution difficult and accompanied by foaming.

One known means for improving the characteristics of α-APM is a method of granulating α-APM. Both wet extrusion granulation (Japanese Patent Application Laid-Open No. 59-95862) and dry compaction granulation (Japanese Patent Publication No. 1-15268) have been described. From the point of view of reducing thermal load and providing a simpler process, dry compaction granulation is preferred.

In dry compaction granulation of α-APM, α-APM is first compacted into a sheet, briquette or the like, which is then broken and milled into granular α-APM. During the breaking and milling, however, a part of the α-APM is powdered. Thus, the product actually obtained by dry compaction is a mixture of a granular α-APM and fine, powdery α-APM.

In order to overcome the above-mentioned problems, the fine powder formed during breaking and milling of compacted α-APM must be removed. In addition, especially from the viewpoint of improving the solubility of the α-APM granules formed, the larger granules must also be removed. Specifically, it is desired that α-APM be granulated to have a particle size falling within the range of from 100 μm to 1400 μm.

In compaction granulation generally, a granulation process is employed for the purpose of obtaining a final granular product having a particle size falling within a desired particle size range in which (1) after a raw powder has been compacted or after the compacted material has been roughly broken, the compacted material or the roughly broken material is broken down or further broken down until the material can pass through a screen or perforated plate having pores with slightly greater than or approximately the same diameter as the uppermost limit of the intended or desired particle size range of the granules, and (2) thereafter the material having passed through the screen or plate is sieved through a sieve having pores with approximately the same diameter as the lowermost limit of the intended or desired particle size range of the granules, and the granules that remain on the sieve are collected as the final product. During sieving step (2), the material which passes through the sieve is recycled to the initial compacting step and is reused.

However, when α-APM is granulated according to this process a problem arises in that the percentage α-APM that is overmilled into fine powder in step (1) above where the compacted α-APM is broken and milled so as to pass through the pores of a screen or plate having approximately the desired maximum particle size is extremely high. This means that the ratio of the amount of the final granular product to the total amount of the compacted α-APM (hereinafter referred to as a "one-pass yield") is low while the ratio of the amount of the fine powdery α-APM which must be recycled is high. Where the one-pass yield is low, the amount of material which must be processed in order to obtain a predetermined amount of the final granular product increases dramatically, causing inefficient reprocessing and the necessity of equipment which is capable of handling large amounts of material.

The addition of a binder such as water, alcohol or the like to α-APM during compaction would be effective for preventing formation of fine powdery α-APM to some degree. However, the presence of, or any increase in the amount of, binder added results in the necessity of a step of drying the α-APM granules obtained, which is unfavorable from an efficiency and/or industrial viewpoint.

In general, a shaking or vibrating sieving machine is employed in step (2) above for removing fine powder by sieving. However, since α-APM powder is very easy to aggregate, it would aggregate on such a shaking or vibrating sieve and would not pass through the sieve. Thus, the use of such a shaking or vibrating sieving machine for the treatment of α-APM involves an additional problem. Lowering of the sieving efficiency results in the problem that the final granular product contains fine powder. In order to avoid this problem, the necessary sieving area must be enlarged, which results in the necessity of enlarging the necessary equipment.

BRIEF DESCRIPTION THE DRAWINGS

FIG. 1 shows a granulation flow chart of Example 1.
FIG. 2 shows a granulation flow chart of Example 2.
FIG. 3 shows a granulation flow chart of Comparative Example 1.

SUMMARY OF THE INVENTION

In view of the above drawbacks of the prior art, one object of the invention is the reduction or prevention of the formation of fine powdery dipeptide, particularly fine powdery α-APM, during compaction granulation so as to obtain a high yield of granular product having a particle size falling within a desired particle size range. This object is accomplished by compaction granulation of raw dipeptide (α-APM) powder under special conditions which elevate the one-pass yield and the sieving efficiency.

DETAILED DESCRIPTION OF THE INVENTION

Figure 1:
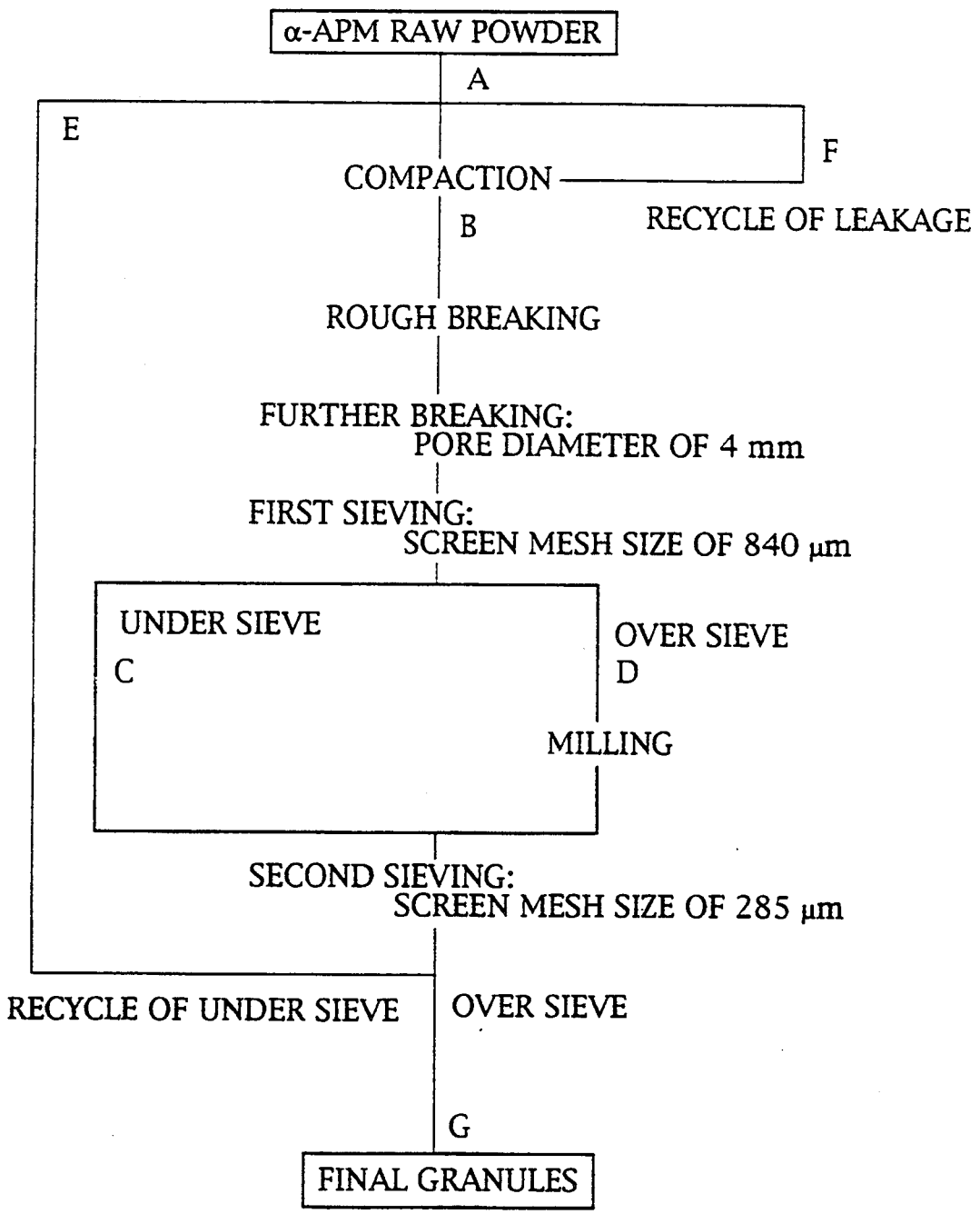

The present inventors have found that when a special screen or perforated plate having pores with a certain diameter is used in the initial breaking of the compacted dipeptide, particularly compacted α-APM (or the roughly broken pieces of such compacted products), such that the broken material is first passed through the special screen or perforated plate, the amount of undesirable powdery α-APM is reduced. The diameter of the pores of the special screen or perforated plate is preferably within the range of from 1 mm to 10 mm, which is approximately ten times larger than the preferred range of the particle size of the intended dipeptide granules including α-APM granules (approximately from 100 μm to 1400 μm). Screen or plate pores of 1~10 mm are useful in the invention.

The degree of lowering of powdery α-APM is extremely large. Even when the percentage of powdery α-APM formed during the breaking of the compacted or roughly broken α-APM by passing it through pores having a diameter falling within the range of from 1 mm to 10 mm is added to the percentage of the powdery α-APM formed during the further additional breaking of the previously broken α-APM down to a particle size falling within the range of from approximately 100 μm to 1400 μm, the sum is far lower than the percentage of powdery α-APM formed in the conventional granulating methods described above.

Further, we have discovered that when compacted 60-APM or roughly broken grains thereof is/are broken down so as to pass through a screen or perforated plate having pores with a diameter falling within the range of from 1 mm to 10 mm and thereafter the resulting α-APM grains are further broken and classified, that the formation of fine powdery 60-APM may be substantially or completely prevented and that the one-pass yield of intended α-APM granules is significantly improved.

We have also discovered that the aggregation of fine dipeptide powder including α-APM powder may be prevented and that the sieving efficiency may be improved by employing a centrifugal sieving method where the dipeptide or α-APM is rotated in the inside of a cylindrical sieve so as to make the material pass through the mesh of the sieve by centrifugal force.

We have applied these novel findings to the process of granulating the dipeptide α-APM alone or mixed with a vehicle in an amount of not more than the same amount (wt./wt.) of the dipeptide via compaction, and we have attained the above-mentioned objects, including a reduction in the size of processing equipment and the improvement of the yield of intended α-APM granules.

Specifically, the present invention provides a method of preparing granules of a dipeptide sweetener where α-L-aspartyl-L-phenylalanine methyl ester is granulated with compaction, singly or along with a vehicle in an amount (wt./wt.) of not more than the amount of ester, to prepare granules of the ester characterized in that, after compaction or after having roughly broken the compacted material, the material is broken down so as to pass through a screen or perforated plate having pores with diameters falling within the range of from 1 mm to 10 mm, and then the material is further broken and classified. For the classification step, any sieving method can be used but a cylindrical centrifugal sieving machine is preferred.

Where a vehicle is used along with α-APM for granulation, the amount of the vehicle (wt./wt.) is desired to be not more than the same amount of α-APM since highly sweet α-APM granules cannot be obtained at low cost if the amount of vehicle is too high. The vehicle of the present invention includes, for example, saccharides such as sucrose or lactose, glycoalcohols such as maltitol or sorbitol, processed starches such as dextrin, and polysaccharides such as alginic acid, and oils and fat. Any kind of vehicle may be used, provided that it is a powder having a particle size allowing it to be uniformly blended with α-APM.

The conditions for the compaction of the raw dipeptide/α-APM material, such as the compaction pressure, etc., are those generally used in the art. By deaerating the feedstock material (including any feedstock material powder) under reduced pressure before compaction, the brittleness of the compacted material may be noticeably retarded such that a firm and dense compacted material may be obtained. The firm and dense compacted material thus obtained may then be broken down with a noticeably lower percentage of fine powder formed so that the one-pass yield of intended α-APM granules is increased. In addition, by deaerating under reduced pressure, the compaction capacity of the compactor used for the granulation is improved. Accordingly, when deaeration during compaction is used in combination with the increase in the one-pass yield due to the special screen or plate mentioned above, the overall efficiency of production of the final α-APM granules of the present invention is noticeably increased.

For rotating the broken material to be sieved in the inside of a cylinder during centrifugal sieving, a method using an air stream and a method using rotors such as blades or the like in the inside of the cylinder are useful. From the viewpoint of preventing aggregation of α-APM, the latter method of using rotors such as blades or the like in the inside of the cylinder is preferred.

For further breaking and classifying the intermediate material which has passed through a screen or perforated plate having pores with a diameter falling within the range of from 1 mm to 10 mm in order to obtain granules having a particle size falling within a desired particle size range, a method may be used where the material having passed through the screen or perforated plate is further broken down such that it is capable of passing through a second screen or perforated plate having pores with a diameter of approximately the same size as the uppermost limit of the desired particle size diameter or the same size as the maximum desired particle size, and thereafter the thus broken material having passed through the second screen or perforated plate is classified so as to remove therefrom fine powdery α-APM having a particle size smaller than the lowermost limit of the desired particle size or than the minimum particle size. Any method of breaking the material may be used such as milling, crushing, etc.

Also employable is a method in which, after the material has been broken down to a size capable of passing through the screen or perforated plate having pores with a diameter falling within the range of from 1 mm to 10 mm, the passed material is classified to a coarse material having a larger particle size than the uppermost limit of the desired particle size range or larger than the maximum desired particle size and a fine material having a smaller particle size than the uppermost desired particle size limit, the former coarse material is then further broken or milled (and optionally classified at the upper particle size limit again) and combined with the latter fine material, and the combined material is classified to remove therefrom fine powdery α-APM having a particle size smaller than the lowermost limit of the desired particle size range or lower than the minimum desired particle size. For milling the coarse material, a bridging-and-cracking method where the coarse material is passed through two rolls each having cutting edges at certain intervals so that the approximate center of the coarse material is pressed and crushed (whereby over-milling of the material is prevented) may be used.

In accordance with the method of the present invention, any dipeptide, and particularly α-APM granules, with a particle size falling within a desired particle size range may be obtained by the compaction granulation (on an industrial-scale if desired) of raw dipeptide or α-APM powder with a significant lowering of the formation of fine powdery dipeptide or α-APM, thereby elevating the one-pass yield of the method. In addition, the sieving efficiency during sieving after breaking is also increased such that the necessary equipment may be reduced in size and/or number and the efficiency of production of the final granules of dipeptide or α-APM is noticeably increased. Thus, the method of the present invention is highly valuable in its practical utility.

EXAMPLES

The present invention will be explained in more detail by way of the following examples. However, it should be noted that the invention is not limited to or by these examples.

Example 1

Continuous granulation of a raw α-APM powder was carried out, in accordance with the flow chart as shown in self-explanatory FIG. 1. As the raw dipeptide powder, air-dried and milled powdery α-APM (having a water content of from 2.5 to 3.0%) was used. The particle size of the desired final granules was from 180 μm to 850 μm. The raw α-APM powder was compacted under pressure, roughly broken and then further broken so as to pass through a perforated plate having pores with a diameter of 4 mm. The thus broken material was thereafter sieved and then milled. In the compaction step, a Roller Compactor (WP265X170 Model, manufactured by Turbo Kogyo Co.) was used. In the first and second sieving steps at approximately the desired particle size extremes, a cylindrical centrifugal sieving machine, Turbo Screener (manufactured by Turbo Kogyo Co.), was used. In the milling step, a bridging-and-cracking type of milling machine named Roll Granulator (manufactured by Nippon Granulator Co.) was used. Just before compaction, the feedstock powder was kept under reduced pressure (−200 mmHg), and was deaerated. In FIG. 1 the under sieve material in the second sieving E is recompacted along with the raw powder A and any material that leaked out of the processing F. Optionally, the milled D material could be re-sieved at the (approximate) upper particle size limit before sieving at the lower mesh size and the oversieve material milled again or recycled to compaction.

Table 1 below shows the particle size distribution of the final granules. Table 2 below shows the processed amounts during the course of the processing steps in FIG. 1 and the one-pass yield (G/B×100). In Example 1, the method of the invention produced 345 kg/hr of the final granules and the one-pass yield was 49.0%.

TABLE 1

| | Particle Size Distribution (wt. %) | | | | |
|---|---|---|---|---|---|
| | up to 180 μm | 180 to 250 μm | 250 to 425 μm | 425 to 850 μm | larger than 850 μm |
| Example 1 | 0.60 | 10.77 | 43.96 | 44.50 | 0.17 |
| Example 2 | 0.50 | 4.81 | 45.28 | 49.31 | 0.10 |
| Comparative Example 1 | 0.52 | 6.03 | 40.31 | 52.92 | 0.22 |

TABLE 2

| | Processed Amount (kg/hr) | | | | | | | One-Pass Yield (%) |
|---|---|---|---|---|---|---|---|---|
| | A | B | C | D | E | F | G | |
| Example 1 | 345 | 704 | 274 | 430 | 359 | 150 | 345 | 49.0 |
| Example 2 | 352 | 676 | 324 | 128 | 352 | — | — | 52.1 |
| Comparative Example 1 | 160 | 525 | 365 | 81 | 160 | — | — | 30.5 |

Example 2

Figure 2:
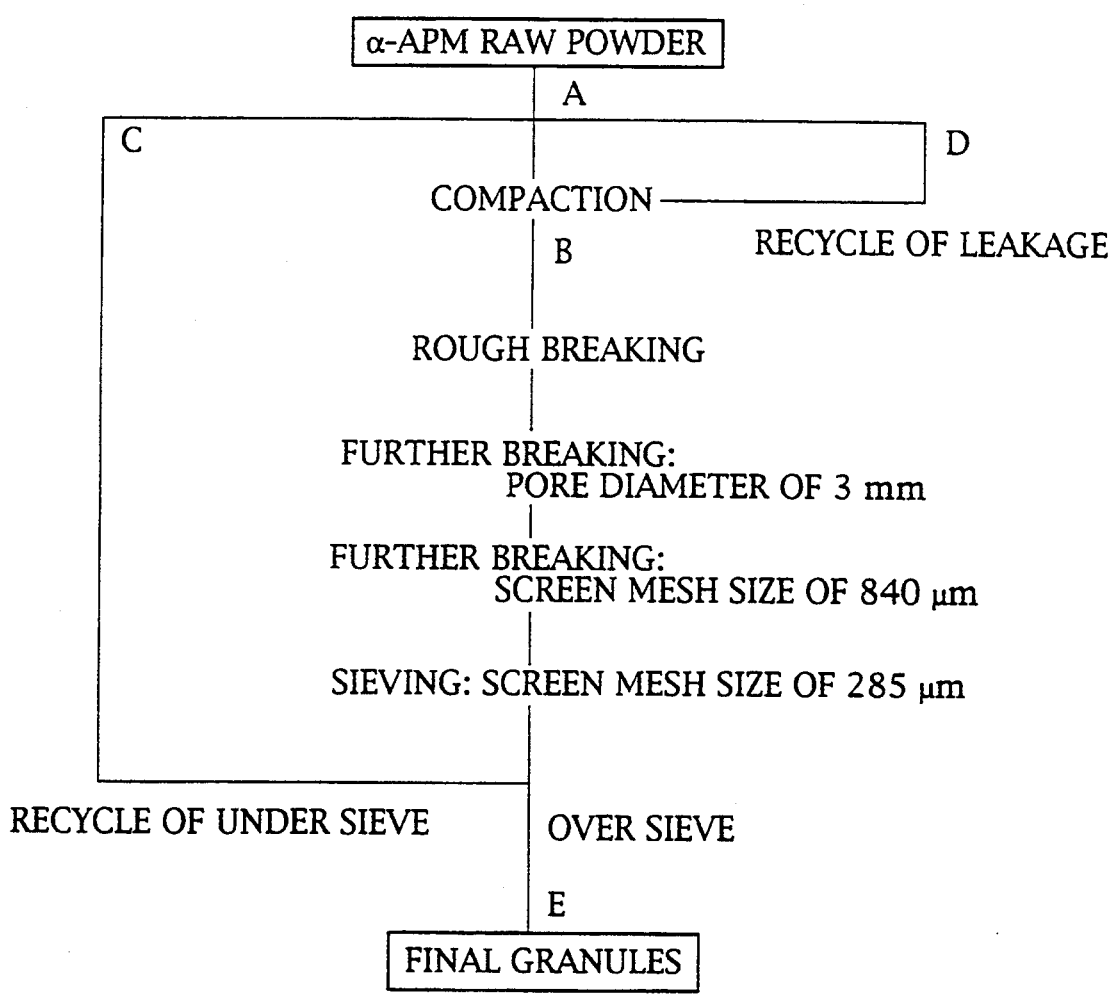

Continuous granulation of a raw α-APM powder was carried out, in accordance with the flow chart as shown in FIG. 2. As the raw powder, air-dried and milled powdery α-APM (having a water content of from 2.5 to 3.0% wet basis) was used. The particle size of the desired final granules was defined to be from 180 μm to 850 μm. The raw α-APM powder was compacted under pressure, roughly broken and then further broken so as to pass through a perforated plate having pores with a diameter of 3 mm. The thus broken material was thereafter again broken and sieved. In the compaction step and the sieving step, the same Roller Compactor (WP265X170 Model, manufactured by Turbo Kogyo Co.) and the same Turbo Screener (manufactured by Turbo Kogyo Co.) as those used in Example 1 were used. Just before compaction, the feedstock powder was kept under reduced pressure (−200 mmHg), and was deaerated.

Table 1 above shows the particle size distribution of the final granules. Table 2 above shows the processed amounts during the course of the processing steps and the one-pass yield (E/B×100). In Example 2, the invention method produced 352 kg/hr of the final granules and the one-pass yield was 52.1%.

Comparative Example 1

Figure 3:
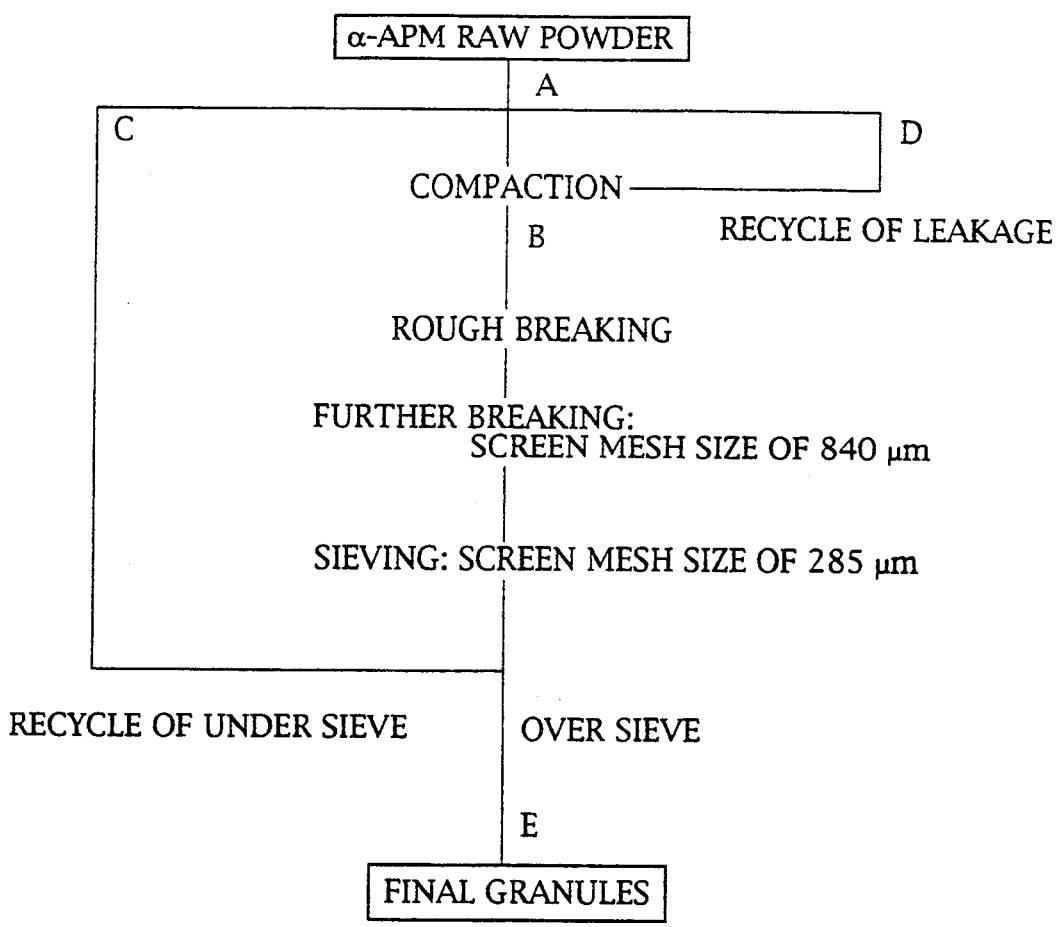

Continuous granulation of a raw α-APM powder was carried out in accordance with the flow chart as shown in FIG. 3. As the raw powder, an air-dried and milled powdery α-APM (having a water content of from 2.5 to 3.0% wet basis) was used. The particle size of the desired final granules was defined to be from 180 μm to 850 μm. The raw α-APM powder was compacted under pressure, roughly broken and then further broken to those capable of passing through a screen having a mesh size of 840 μm. In the compaction step and the sieving step, the same Roller Compactor (WP265X170 Model, manufactured by Turbo Kogyo Co.) and the same Turbo Screener (manufactured by Turbo Kogyo Co.) as those used in Example 1 were used. The feedstock powder was not subjected to deaerating under reduced pressure.

Table 1 above shows the particle size distribution of the final granules. Table 2 above shows the processed amounts during the course of the processing steps and the one-pass yield (E/B ×100). In Comparative Example 1, the one-pass yield was only 30.5% and the production of the final granules was less than a half that of the previous examples or only 160 kg/hr.

What is claimed as new and desired to be secured by Letters Patent of the United States is:

1. A method of preparing granules of a dipeptide sweetener comprising compacting α-L-aspartyl-L-phenylalanine methyl ester sweetener alone or in the presence of a vehicle of not more than the same weight amount as the weight of the ester, breaking down the sweetener so as to allow it to pass through a screen having pores with diameters in the range of from 1 mm to 10 mm, and then further breaking and classifying the sweetener.

2. The method as claimed in claim 1, in which the sweetener is deaerated under reduced pressure before compaction.

3. The method as claimed in claim 1, in which a cylindrical centrifugal sieving machine is used for classifying the sweetener.

4. The method as claimed in claim 1, in which the sweetener is, after having been broken down to pass through a screen having pores with a diameter falling within the range of from 1 mm to 10 mm, further broken down so as to pass through a screen having smaller pores and then classified to remove therefrom fine material having a smaller particle size than the uppermost limit of a desired particle size limit.

5. The method as claimed in claim 1, in which the sweetener is, after having been broken down to pass through a screen having pores with a diameter in the range of from 1 mm to 10 mm, and classified, any resulting classified coarse material having a larger particle size than the uppermost limit of a desired particle size range is milled and again classified to remove therefrom fine material having a smaller particle size than the uppermost limit of a desired particle size limit.

6. The method as claimed in claim 5, in which the milling of the coarse material is effected with a bridging-and-cracking type of milling machine.

7. The method of claim 1, wherein the granules have a size of from 100–1400 μm.

8. The method of claim 1, wherein the granules have a size of from 180–850 μm.

* * * * *